Dec. 18, 1951  F. LYIJYNEN  2,578,709
FLEXIBLE LAMINATED TRIM PANEL
Filed Feb. 15, 1949
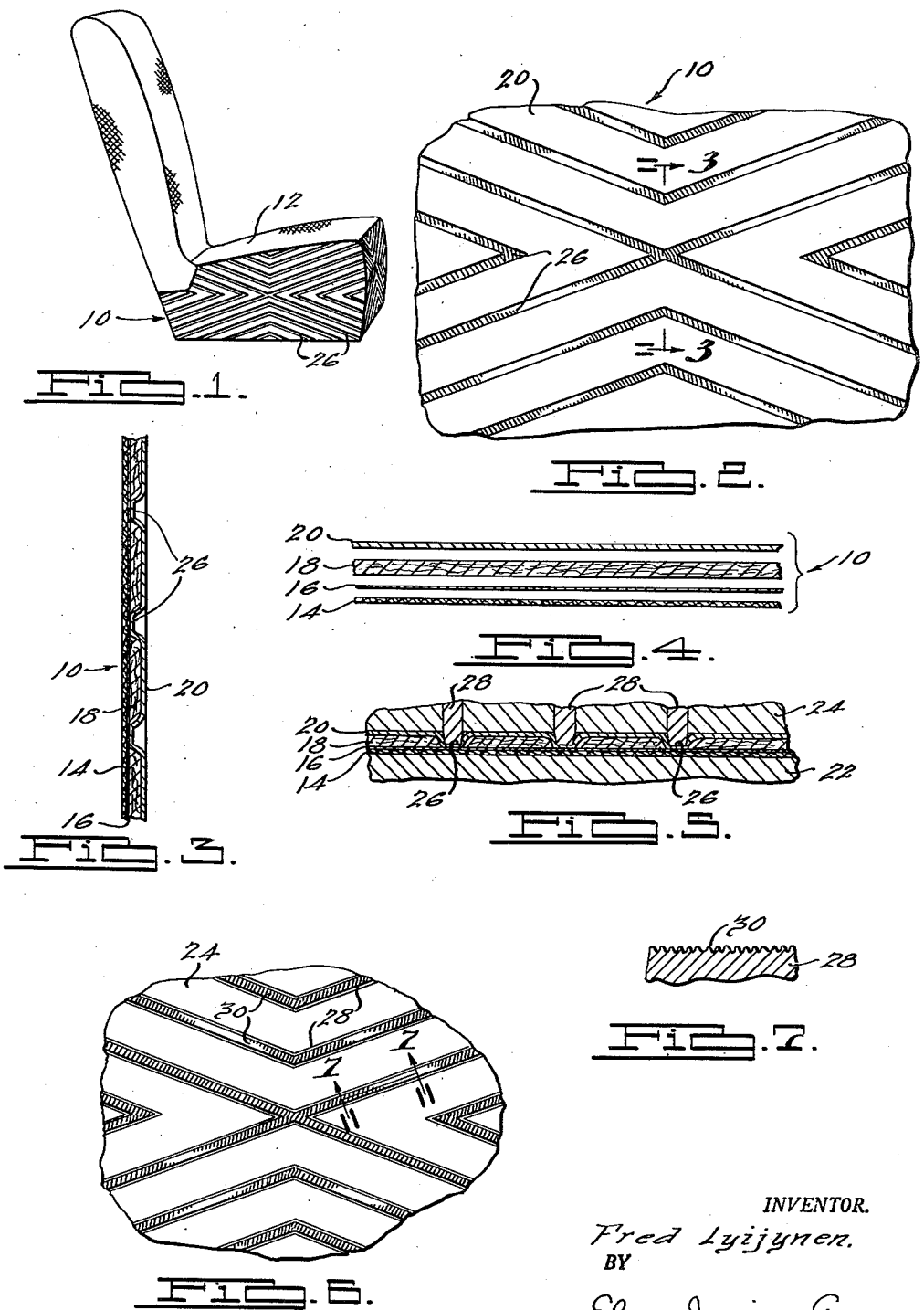
INVENTOR.
Fred Lyijynen.
BY
Elmer Jamison Gray
ATTORNEY.

Patented Dec. 18, 1951

2,578,709

UNITED STATES PATENT OFFICE 2,578,709

FLEXIBLE LAMINATED TRIM PANEL

Fred Lyijynen, Detroit, Mich., assignor to Briggs Manufacturing Company, Detroit, Mich., a corporation of Michigan Application February 15, 1949, Serial No. 76,469

6 Claims. (Cl. 154—46)

The present invention relates to ornamental flexible panels or similar articles, comprising a plurality of superimposed laminations bonded together and being particularly useful to provide an ornamental upholstered trim or covering for portions of automobiles or other vehicle bodies, and to an improved method and apparatus for fabricating such panels or articles. However, the present invention is well adapted for other uses and is applicable for the fabrication of various panels, articles or structures intended for many different purposes.

A panel constructed in accordance with the present invention preferably comprises a number of superimposed sheets or layers of material consolidated or bonded together under heat and pressure through the medium of bonding agent preferably comprising a thermosetting or thermoplastic resinous material. The laminations of the composite panel usually include a foundation layer, which itself may be composed of one or a plurality of layers, and one or more top or cover layers which may be treated for design or ornamental purposes. A portion or all of the panel area may be upholstered, as by employing a padding layer interposed between the cover and foundation layers.

In fabricating a panel or other laminated structure in accordance with the present invention, the assembled foundation, padding and cover layers are laminated with a suitable thermosetting or thermoplastic bonding resin applied between one or more of the layers. Thereafter the laminations are bonded together between the heated platens of a press, particularly along predetermined lines or seams in accordance with a desired ornamental pattern. To this end, the platen confronting the top or outer panel layer is provided with a pattern forming die having a number of elevated ribs or raised portions arranged to emboss or impress a desired pattern of grooves or depressions into the outer layers of the panel. As the platens or die plates are pressed together in the bonding action, the ribs or elevations of the pattern forming die depress the outer and underlying panel layers tightly toward the foundation layer. The bonding resin, particularly at the depressed regions, is thus heated and compressed so as to permeate the adjacent layers of the panel, bonding the same permanently to each other and to the foundation layer along the grooves or depressions which effect an ornamental design embossed in the exterior surface of the panel.

A serious difficulty encountered in the practice outlined above is that slight variations in the thickness of the panel layers, or in the elevated facing of the pattern forming die, will result in highly magnified pressure variations on the panel at the depressed regions thereof during the bonding operation. This difficulty is particularly troublesome where the panel layers overlying the foundation layer are of considerable thickness, as in the case of upholstered panels. Thus, if one region of the compressed panel layers under the ribs or elevations of the pattern forming die is slightly thicker than an adjacent region, the thicker region will assume the major compressional force of the platens and a strong permanent bond will be made only at the thicker region. The pressure at the adjacent thinner portions of the panel will frequently be insufficient to effect a strong bond thereat. As a result, the padding and outer panel layers tend to pull away from the foundation layer along substantial portions of the grooves or depressions whereat a uniformly strong and permanent bond or seam is desired.

The difficulty of economically providing panel layers having the required uniformity of thickness for the fabrication of panels by mass production methods is believed to be readily apparent. Accordingly finished panels constructed in accordance with conventional production methods are frequently imperfectly bonded or bonded spottedly along the grooves or depressed region. A means susceptible to the mass production of panels for economically achieving a uniformly strong and lasting bond between the panel layers throughout preselected regions thereof has been greatly desired.

Still another difficulty encountered in the construction of upholstered panels is the maintenance of a soft compressible cushioned or padding effect between adjacent depressed seams or bonded regions. A customary type of upholstery or padding material employed between the foundation and outer layers has comprised a fibrous matting, such as cotton batting or the like, which is tightly compacted at the grooves or depressed regions of the bond. By reason of the comparatively long and strong intermeshed fibers of the upholstery mat or padding, the latter is undesirably flattened or compressed for an appreciable distance on either side of the bonded region, thereby materially impairing the final upholstered effect desired. Thus, instead of a fully cushioned upholstered region adjacent the depressed seam or bond, the matted padding is tightly packed at the edge of the bond and only gradually assumes its normal uncompressed state as the distance from the bond increases. Accordingly a panel which provides a sharp demarcation between the compactness of the padding at the depressed regions of the seam or bond and the adjacent regions, so as to achieve a fully upholstered effect immediately adjacent the seam or bond, is highly desirable.

Likewise, the use of a cloth or fabric cover layer for the upholstered panel, although desirable for certain decorative purposes, also tends to compress or mat the underlying padding adjacent the grooves or depressed regions of the seam or bond. Accordingly a sheeting or cover layer suitable in other respects for the upholstered panel, but which will submit to depression into the panel at the regions of the bond between the panel layers without materially compressing or matting the adjacent areas, is also highly desirable.

Pliable sheeting of certain of the vinyl type resins has many properties particularly suited for such uses, being tough, wear resistant, pleasing in appearance for decorative purposes, and generally less costly than cloth or fabric of comparable durability, strength and decorative appeal. Also such vinyl resin sheeting is capable of stretching under the influence of heat and pressure to permit its depression into the regions to be bonded without exerting an objectionable compressional force on the upholstered portions of the panel adjacent the bond. However, prior to the present invention, difficulty has been experienced in utilizing vinyl resin sheeting with the molding and bonding processes required for the fabrication of panels of the class contemplated.

For example, the recommended temperature for molding suitable vinyl type resin sheeting in operations of the foregoing character lies in the approximate range of 200 degrees F. to 225 degrees F. At these temperatures, the curing of the bonding resin is slow and inefficient. Not only is production retarded and costs increased, but imperfect bonding frequently results. Likewise, in bonding the vinyl sheeting to comparatively thick padded or upholstered underlayers, the bonding pressure required to assure proper impregnation of the bonding agent into the padding layers frequently tends to tear or rupture the vinyl sheeting in the bonding action.

Prior use of such vinyl sheeting has required hand sewing to secure the vinyl sheeting to the other panel layers. Not only is the sewing operation slow and costly, but the decorative designs permitted are limited. Accordingly a means or process is highly desirable whereby an exterior sheeting of a vinyl type resin may be feasibly bonded to the underlying panel layers and whereby the temperature range of the bonding reaction may be materially increased.

Likewise difficulty has been experienced in the fabrication of such laminated articles or panels having sufficient flexibility or pliability to permit their use as a general upholstery covering for curved surfaces, as for example in covering the curved surfaces of automobile seats, vehicle interiors, household furniture, and the like.

It has been customary in the fabrication of such laminated panels or articles to employ a suitable thermosetting phenolic resin such as a partially reacted or partially polymerized phenol-formaldehyde product as the bonding agent between the foundation and upper layers. The uncured or partially reacted bonding resin is dissolved in a suitable volatile solvent and applied by spraying, brushing, or coating in the form of a varnish to one or more of the layers, as for example to the upper surface of the foundation and to the under surface of the cover layer having a padding layer interposed therebetween, or applied in a fibrous sheet or matrix of cellulose or paper in the nature of blotting paper, or a loosely woven fabric. In the latter application the fibrous matrix is impregnated with the resinous varnish and allowed to dry, cut to panel size, and then laminated between selected layers of the panel materials, usually between the foundation and padding.

In either instance, the bonding resin is fused by the application of heat and pressure during the bonding reaction and is caused to permeate the padding layer and usually to a limited extent the foundation and cover layers. Under the influence of heat and pressure, the reaction of the bonding agent is completed and a strong and lasting bond between the various laminations is effected. It is of course important during the bonding action for the bonding resin to permeate the intermediate padding completely at the regions where efficient bonding is desired between the foundation and cover layers. The phenolic type bonding resins have been adequate in this respect and are accordingly particularly desirable where a strong and efficient bond is the sole consideration.

Where pliability or flexibility of the resulting panel is of prime importance, the customary bonding practice is objectionable in that the reacted or polymerized resin is stiff, and when absorbed by an otherwise pliable foundation layer under the pressure of the bonding operation, imparts an undesirable rigidity to the completed panel. As a result, the completed panel will not readily conform to various curved surfaces which otherwise could be upholstered to advantage by panels of the foregoing character, tends to crack and buckle instead of lying flush with the curved surface to be upholstered, and is generally difficult to work, requiring undue time and skill on the part of the upholsterer in its application. Accordingly a tough, sturdy, lightweight foundation layer has been particularly desirable which can be readily bonded to the padding and cover layers without stiffening during the bonding operation, which affords sufficient tensile strength to the resulting panel to prevent the same from pulling out of shape under severe use, as for example when used as a seat covering, and which permits tacking of the resulting panel to a base or frame to be upholstered.

Important objects of the present invention are therefore to eliminate or minimize the above defects and disadvantages so as to provide a superior flexible panel or panel-like article of the type contemplated, wherein by the application of heat and pressure a cover layer is bonded to a foundation, which may be upholstered or not as desired; and to provide an improved method and apparatus for the manufacture of such an article.

Other objects of the invention are to provide an improved flexible panel and method and apparatus for its manufacture wherein ornamental grooves or depressions are impressed into the covering material of the panel, and wherein a superior bond between the covering and the panel foundation is effected at the locality of the grooves or depressions; and in particular to provide such a panel and method and apparatus for its manufacture whereby the panel may be economically fabricated from conventional materials by mass production methods.

Another and more specific object of the invention is to provide an improved panel of the foregoing character and a method and apparatus for its manufacture wherein the bonding pressure is applied at a multitude of small sharply defined and closely spaced regions along the lines of the ornamental grooves or depressions, thereby achieving an ornamental knurled appearance along the ornamental grooves or depressions and also effecting a superior bonding action along the grooves or depressions by virtue of the closely spaced pressure regions.

Other objects are to provide an improved flexible laminated panel having a superior, economical and long wearing outer or top covering comprising a vinyl type resin sheeting, such as a vinyl acetal resin for example, or a vinyl ester resin, as for example a polyvinyl acetate, a polyvinyl chloride, or a polyvinyl chloride-vinyl acetate, bonded to one or more underlying panel layers; and to provide an improved method and apparatus for the fabrication of such a panel whereby the feasable temperature range of the bonding reaction may be materially increased and whereby the vinyl type sheeting may be feasibly bonded to comparatively thick upholstered or padded underlayers with a minimum tendency to fracture or rupture the vinyl layer in the bonding operation.

Other objects are to provide an improved pliable upholstered panel comprising an outer cover layer and an intermediate padding layer bonded to a foundation layer along depressed seams whereat the padding and outer layers are tightly compacted against the foundation without objectionably interfering with the adjacent upholstered area of the panel; and in particular to provide such a panel wherein the compression of the padding adjacent the depressed seams is minimized, achieving an optimum upholstered or padded effect for the panel at the regions thereof adjacent the depressed seams.

Other objects of the invention are to provide an improved panel and method for its manufacture wherein the foundation is bonded to the overlying layer by means of a thermoplastic bonding resin and wherein important economies in the application of the bonding resin are achieved; and to provide an improved manner for applying the bonding resin whereby the resin may be readily and conveniently handled and applied between the panel layers as required prior to the bonding operation, and whereby the quantity of bonding resin to be employed may be easily and accurately controlled, thereby minimizing the waste of costly resin and avoiding the use of a greater quantity of resin than required to effect a strong durable bond between the panel layers.

Other objects are to provide a superior flexible panel wherein an outer cover layer overlying a padding layer is bonded to an intermediate foundation layer at selected regions, the latter in turn being bonded to a flexible sub-foundation by the application of heat and pressure without seriously impairing the initial flexibility of the sub-foundation; and in particular to provide such a panel wherein the cover layer is efficiently bonded to the padding and to the intermediate foundation at selected regions by a bonding agent including a phenolic type resin whereas the intermediate foundation layer is bonded to the sub-foundation by a comparatively pliable thermoplastic vinyl type resin.

Still another and more specific object is to provide an improved panel of superior flexibility comprising an outer cover layer, preferably but not necessarily of a pliable vinyl type resin sheeting, and an underlying padding layer overlying a thin intermediate foundation layer of a vinyl type sheeting, these layers being bonded together by the application of heat and pressure at selected regions and the thin vinyl type sheeting being similarly bonded to an underlying tough pliable fabric sub-foundation to afford the required tensile strength for holding the panel in shape and to permit the panel to be readily and feasibly sewed or tacked to a base or frame for which the upholstered panel is provided.

Another object is to provide such a panel of superior flexibility wherein the regions of the bonds between the panel layers preferably but not necessarily comprise comparatively thin linear seams or grooves, depressed or embossed into the cover layer during the bonding operation to afford optimum flexibility and pliability of the resulting panel in bending or folding parallel to the lines of the bonds or seams, and wherein the linear grooves at the bonds or seams are characterized by relatively short closely spaced knurlings to effect optimum pliability of the resulting panel in bending or folding transverse to lines of the bonds or seams. By virtue of this structure, the bonded panel is readily adapted to conform to various curved contours and is rendered easy to work, permitting its installation with a minimum of time, skill and effort required of the upholsterer.

Other objects of this invention will appear in the following description and appended claims, reference being had to the accompanying drawings forming a part of this specification wherein like reference characters designate corresponding parts in the several views.

Fig. 1 is an isometric view taken primarily from one side of an automobile seat frame upholstered in part by a flexible laminated panel structure fabricated in accordance with one embodiment of the present invention.

Fig. 2 is a fragmentary enlarged elevation of a portion of the laminated panel structure shown in Fig. 1.

Fig. 3 is a fragmentary enlarged section taken in the direction of the arrows substantially along the line 3—3 of Fig. 2.

Fig. 4 is an enlarged fragmentary exploded view in section illustrating prior to the bonding operation substantially the component parts of the panel shown in Fig. 3.

Fig. 5 is a fragmentary sectional view through the bonding platens or embossing dies and the component parts of the panel shown in Figs. 3 and 4, illustrating the manner in which these parts are bonded together.

Fig. 6 is a fragmentary bottom view of the upper embossing die shown in Fig. 5.

Fig. 7 is a fragmentary enlarged section taken in the direction of the arrows substantially along the line 7—7 of Fig. 6.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular application of the present invention is illustrated by way of example in the drawings wherein a flexible upholstered panel or laminated structure, indicated generally by the numeral 10, is shown as applied to provide an upholstered wrapping around the lower sides or base portions of a conventional automobile seat 12. The panel structure 10 is of the type which may be used as part of the decorative interior trim for an automobile body, such as on the interior body walls thereof or as an upholstery covering for the seats and frames thereof. Accordingly, although the panel 10 is shown in the present instance applied to the lower base portions of the seat 12, it will be readily understood from the following that the laminated panel structure or covering material 10 is particularly adapted for covering any portion of the seat or frame structure 12 or other types of furniture or other articles where such an upholstered covering is desired.

In general, the flexible upholstered laminated structure or panel 10 made in accordance with the present invention comprises a tough flexible fabric sub-foundation layer 14, an intermediate foundation 16 preferably comprising a comparatively thin thermoplastic sheeting of a vinyl type resin overlying the foundation 14, a layer of padding or wadding 18 overlying the intermediate foundation 16, and an outer cover layer 20 overlying the padding or upholstery layer 18.

A particularly desirable cover layer employed and made feasible in accordance with one application of the present invention comprises a flexible sheet of a thermoplastic vinyl type resin, such as a vinyl acetal resin for example, or a vinyl ester resin such as a polyvinyl acetate, a polyvinyl chloride or a polyvinyl chloride-vinyl acetate. However, a cover layer 20 of fabric or cloth or other suitable material, such as carpeting or imitation leather for example, may be employed in particular instances where desired. The preferred vinyl type resin sheeting for the cover layer 20 is characterized by a pleasing appearance for decorative purposes, is highly wear resistant, and is generally less costly than cloth or fabric of comparable strength and decorative appeal. As will be apparent from the following, such vinyl sheeting also exhibits other properties which render it particularly suitable and desirable in the construction of panels of the class involved herein.

The intermediate foundation 16 is employed to effect a flexible bond between the sub-foundation 14 and padding 18, as described in more detail hereinafter, and is preferably a thermoplastic vinyl type resin of the aforementioned nature of the vinyl resin cover layer 20. However, it will be apparent from the following that other flexible thermoplastic sheetings having the toughness and bonding characteristics comparable to the vinyl resin may be employed where desired. Vinyl sheetings ranging in thickness from approximately .004 to approximately .012 inch have been successfully used for the layer 16 in the ordinary instance with the preferred cloth or fabric foundation 14. Obviously, the thinnest layer 16 feasible to effect a strong and lasting bond between the foundation layer 14 and padding 18 is preferred for maximum economy. The foundation 14 may be of any suitable tough flexible fabric having a thickness and character selected to afford the desired tensile strength to the resulting panel. The foundation 14 is preferably a coarse open weave cloth sheeting adapted to hold its shape against stretching forces and to permit the panel to be secured, as by tacking or sewing for example, to the frame or base to be upholstered.

The wadding or padding layer 18 may comprise any suitable soft deformable material capable of being employed to cushion the outer surface of the panel. Multiple layers of crepe paper are satisfactory for this purpose. As discussed in more detail hereinafter, it has been found that a superior upholstered effect may be achieved by the employment of a fibrillar padding of comparatively low tensile or shear strength, such as multiple thin layers of soft crepe paper.

The foundation layers 14 and 16 and padding 18 and cover layer 20 are assembled and laminated in superimposed relation, as shown in Fig. 4, with a suitable bonding agent applied between selected layers. They are thereafter subjected to a pressing operation between the heated platens 22 and 24 of a press, Fig. 5, during which operation the layers or laminations are heated under pressure and consolidated or unified so as to bond the laminations together. In the present instance, the primary bond or seam between the laminations is maintained along ornamental lines defined by relatively deep indentations or grooves, such as the grooves 26, Figs. 1 and 2. The arrangement of the grooves or indentations 26 in the angular or wedge type pattern of Fig. 2 is purely for illustrative purposes. It will be apparent that the lines or localities at which the laminations or panel layers are pressed together so as to effect a bond therebetween may be varied as to configuration or otherwise in order to produce any desired pattern or design.

The bonding agent used to consolidate the layers 16, 18 and 20 along the grooves or depressions 26 may be applied in the form of a varnish composed of a bonding resin dissolved in a suitable volatile solvent. The varnish is then applied by spraying or brushing directly on selected laminations, preferably the upper surface of the layer 16 and the under surface of the layer 20.

In the particular instance, a vinyl type bonding agent or equivalent cement compatible with the vinyl layers 16 and 20 will necessarily be employed to effect the bond between the same and the padding 18. Preferably the bonding agent in the aforementioned varnish comprises a mixture of a vinyl type bonding agent with a phenolic type bonding agent, such as a partially polymerized or partially reacted phenol-formaldehyde product or other suitable phenolic resin which is capable of further reaction or curing when subjected to heat and pressure between the platens 22 and 24 during the pressing or bonding operation. In such mixtures, the proportion of the phenolic type bonding agent may vary from approximately fifty percent to approximately twenty percent, with the vinyl type bonding agent varying correspondingly from approximately fifty percent to approximately eighty percent. Where the extent of flexibility or pliability of the resulting bonded panel is important, the smaller proportions of the thermosetting phenolic resin are employed because the polymerized or reacted phenolic resin increases the resulting stiffness of the panel after the bonding operation. However, the fluidity of the phenolic resin type bonding agent in the bonding operation and its ability to thoroughly impregnate the padding layer 18 renders its use in the mixture highly desirable for optimum bonding strength.

Referring to Fig. 5, the various laminations of the composite panel are assembled for the bonding operation and consolidated together under heat and pressure in a suitable press, which is preferably hydraulically actuated and adapted for pressing the aforementioned heated lower and upper platens 22 and 24 toward each other. The lower platen 22 is preferably plane to engage the plane outer surface of the foundation 14. The upper platen 24 is provided with a plurality of ribs or upset pattern forming portions 28 raised from the platen face 24 to impress or emboss the aforementioned depressed regions or grooves 26 into the panel face.

Upon operation of the press, the aforementioned pattern forming ribs 28 are impressed deeply into the cover layer 20 and underlying padding 18, compacting these layers together and against the foundation layers 16 and 14 in accordance with a predetermined desired pattern. Along the resulting grooves or lines of pressure, the compressed and heated bonding agent applied initially to the layers 16 and 20 is caused to permeate the compressed wadding or padding 18 and to some extent the layers 16 and 20 so as to consolidate or bond these layers securely together at the compressed regions beneath the ribs or raised die elements 28.

During the pressing operation, the temperature and pressure of the platens 22 and 24 are regulated by any suitable means so that the bonding resin is cured or brought to a final stage of reaction or polymerization. As a consequence, the panel layers 16, 18 and 20 are securely and permanently bonded together upon completion of the curing or reaction of the bonding resin, while substantial areas of the panel between the lines of pressure or grooves 26 remain uncompressed, giving the finished panel as a whole a soft upholstered effect ornamented by the embossed grooves or depressed regions.

Simultaneously with the compression and reaction of the bonding resin which is applied originally to the upper surface of the layer 16 and under surface of the layer 20, the under surface of the thermoplastic vinyl layer 16 is pressed or impacted into the pores or interstices of the underlying fabric foundation 14 and is thereby bonded securely to the latter along the lines of bonding pressure under the ribs 28. In this connection, the temperature of the platens 22 and 24 tends to soften or fuse the thermoplastic vinyl layer 16 during the bonding action, particularly under the ribs 28, so as to effect a thorough commingling of the fabric 14 with the adjacent under surface of the thin vinyl layer 16. As a consequence, upon completion of the bonding action and cooling of the panel, a strong permanent adhesion or bond is effected between the layers 14 and 16 along the lines of the grooves or depressions 26.

It is important to observe in accordance with the foregoing procedure that the flexibility of the sub-foundation or fabric 14 is not materially impaired as a result of the bonding action, since the intermediate vinyl layer 16 serves as a shield to prevent impregnation and consequent stiffening of the layer 14 by the phenolic type bonding resin between the layers 16 and 20. Not only does the use of a flexible thermoplastic vinyl resin sheeting 16 achieve increased flexibility for the resulting panel by supplanting the thermosetting phenolic resin that would otherwise be required to bond the padding 18 to the foundation 14, but it permits convenient handling of the bonding resin and its application in a readily controlled quantity between the layers 14 and 18. It is thus conveniently feasible to apply the vinyl resin sheeting 16 in a layer of any predetermined desirable thickness required to effect an efficient bond with the foundation 14, avoiding excessive or wasteful use of expensive bonding resin.

A limited stiffening of the panel results of course along the lines of the seams 26, but this stiffening is minimized by employing proper percentages of the vinyl bonding agent in the bonding mixture and is further minimized by the particular character of the grooves or seams 26 which is discussed in more detail hereinafter.

It is to be noted that the pattern forming ribs 28 are impressed deeply into the padding layer 18 during the bonding operation, Fig. 5. Because of the comparatively slight tensile or shear strength of the preferred fibrillar matting 18, such as the aforementioned multiple layers of soft crepe paper, the matting 18 is compacted tightly beneath the pattern forming ribs 28 but is sheared along the edges of the latter. The fibers of the matting 18 apparently break down or are sheared along the edges of the pattern forming ribs 28, minimizing the tendency of the compressed matting 18 along the seams or lines of pressure to compress or mat downward the adjacent regions of the matting 18 whereat the full upholstered effect is desired. Accordingly, in comparison to conventional long fibered matting material, such as cotton batting for example, the preferred multiple layers of fibrillar crepe paper permit the formation of rather sharply defined shoulders along the various grooves whereby a superior upholstered effect between the grooves or depressed regions is permitted with a minimum of padding material.

In a somewhat similar manner, the vinyl type resin cover layer 20 also contributes to a superior upholstered effect by minimizing the tendency to depress the upholstered regions of the panel adjacent the lines of pressure or grooves during the bonding operation. For example, in employment of the conventional cloth or fabric cover layer, the latter does not give or stretch appreciably during the bonding operation and accordingly tends to depress or carry downward the portions of the cover layer adjacent the pattern forming ribs 28 during the bonding operation. To a certain extent, this effect is minimized by applying the cloth layer sufficiently loosely across the padding 18 prior to the bonding operation to allow for the subsequent depression of the cloth cover layer into the grooves 26. Such a procedure is inconvenient and is not entirely satisfactory. On the other hand, the preferred vinyl type resin sheeting 20 tends to stretch under the influence of the heat and pressure of the bonding operation and is readily depressed by the pattern forming ribs or die elements 28 into the grooves or depressed regions 26 with a minimum of disturbance to the adjacent portions of the vinyl layer 20.

By application of the present invention thus far described, the economical fabrication of a superior panel for many purposes is achieved, wherein the feasible temperature range permitted for the bonding of the vinyl type resin outer layer 20 to the padding 18 is increased in many operations to approximately 350° F. without injury to the panel. Thus the temperature range of the bonding operation may be feasibly varied within the range of approximately 200° F. to approximately 350° F., in accordance with the particular requirements of the operation, permitting a substantial reduction in the time required for each bonding operation and a corresponding increase in production with consequent economies.

In some instances, difficulty is encountered in achieving a strong and lasting bond along the entire length of the seams or grooves 26. For example, slight variations in the resulting thickness of the panel layers after compression or slight variations in the elevations of the pattern forming ribs 28 of the die frequently result in an undesirable uneven distribution of the bonding pressure along the said grooves or regions of depression. Slightly thicker regions of the panel layers receive an undue proportion of the bonding pressure of the pattern forming ribs or die elements 28, whereas slightly thinner adjacent portions of the panel are relieved of the bonding pressure. Thus the panel may be imperfectly or spottedly bonded along the length of the grooves 26. In order to minimize the objection of pressure variations along the line of the bond or seam and to assure proper impregnation of comparatively thick panel layers, such as a thick padding layer 18, without recourse to an excessive use of bonding resin, increased pressure between the platens 22 and 24 may be employed. However the increased pressure frequently causes the pattern forming ribs or die elements 28 to fracture or break through the vinyl type resin layer 20.

These difficulties are avoided or minimized and the range of applicability of the present invention is materially increased by providing knurled or corrugated pressure exerting lower faces 30, Figs. 6 and 7, for the pattern forming die elements or ribs 28. As indicated in Fig. 7, the crests of the corrugated knurlings 30 provide a plurality of comparatively small and closely spaced pressure exerting regions. The knurlings or corrugations 30 are preferably formed on the bias as shown, although it will be apparent from the following that the present invention is not dependent upon the specific knurled pattern employed and that other configurations of the pressure exerting faces of the die elements or ribs may be employed to provide a plurality of comparatively small and closely spaced pressure exerting regions.

By virtue of the knurled die faces 30, the pressure exerted between the platens 22 and 24 during a bonding operation is concentrated primarily at the crests of the various corrugations, amounting to approximately one-half the total area of the faces of the pattern forming ribs or die elements. Accordingly, for the same force exerted by the press, the pressure exerted by the crest of each corrugation 30 will be approximately double that which would otherwise be experienced with a die element or rib 28 having a plane or smooth pressure exerting face. Obviously the pressure exerted during a bonding operation on the panel cover layer 20 at the trough of each corrugation will be appreciably less. Thus a distinctive ornamental knurled or corrugated effect will be embossed into the base of each depressed seam or groove 26 as indicated in Fig. 2.

A primary and efficient bonding action is assured along the length of the various grooves or depressed regions at the closely spaced pressure areas underlying the crests of the corrugation 30, regardless of minor variations in the thickness of the padding 18 or the other layers of the panel. Substantial variations in the thickness of the compressed panel layers up to at least two hundredths of an inch will not materially interfere with the efficiency of the bonding operation. Furthermore, by applying the optimum bonding pressure at a plurality of closely spaced points, any portions of the panel elements that are not adequately bonded to each other will be closely bounded by strongly bonded regions on either side thereof, so that the unbonded regions, if any, will be unobjectionable and in fact not ordinarily noticeable.

The employment of the knurled or corrugated die faces 30, substantially doubling the effective bonding pressure at said crests, also assures that the bonding agent applied to the layers 16 and 20 will efficiently permeate the padding 18 and positively contact the layers 16 and 20 at said crests. Thus a strong bond is assured with a minimum use of bonding resin and an appreciable saving in the production cost for panels of the foregoing character is permitted by decreasing the amount of bonding resin required for an optimum bonding effect. An upholstered panel having a padding layer 18 of increased thickness is permitted without a corresponding increase in the quantity of bonding resins required to permeate the thicker padding.

Still another advantage gained from the construction shown is that, by reducing the overall pressure required between the platens 22 and 24 for a bonding operation, the use of the vinyl type resin layer 20 is made particularly feasible. The danger of rupturing or tearing the vinyl layer 20 during the bonding operation is so greatly reduced that platen temperatures of 350° F. to approximately 375° F. may be readily employed in many instances, assuring optimum speed in the bonding reaction and materially increased production and decreased costs. Likewise by concentrating the bonding pressure at the crests of the knurling 30, increased bonding pressure is also exerted at small closely spaced localized areas of the intermediate vinyl sheet 16, increasing the fluidity of the latter at said localized regions of increased pressure and assuring a superior bond thereat between the fabric sub-foundation 14 and layer 16, and between the layer 16 and padding 18.

It is also to be observed in applicant's preferred construction that the various panel layers are bonded together along comparatively thin linear grooves 26 having a knurled pattern embossed therein in accordance with the plurality of comparatively short and closely spaced maximum pressure exerting regions at the crests of the knurling 30. Although the panel will be somewhat stiffened at the region of the bond and the compacting of the thermosetting bonding resin, this stiffening takes place substantially along the linear grooves 26 so that any folding or bending of the resulting panel along lines parallel to the grooves 26 is not appreciably hindered, in contrast to the stiffening that would otherwise result if the bonding were over a substantial broad continuous area of the panel. Likewise, by virtue of the biased knurled pattern extending substantially transverse to the lines or grooves 26, lengthwise bending or folding of grooves 26 is facilitated. Accordingly the flexibility of the resulting bonded panels is materially increased. It is to be understood that the advantages of this construction are not dependent solely upon the employment of transverse knurlings. Other knurled patterns, wherein the individual crests or troughs are broken into comparatively short elements to afford a multitude of closely spaced yield points, may readily be employed in view of the disclosures herein to facilitate adaptation or conformation of the panel to curved surfaces.

I claim:

1. A flexible panel structure comprising an outer cover layer of thermoplastic resin, a pliable foundation and an intermediate padding layer, said cover and padding layers being compacted against the foundation at selected regions to provide depressed areas in which the cover layer along the bottoms of said areas is disposed below the cover layer in the regions adjoining said areas, the bottoms of said areas being additionally formed with closely spaced indentations at the locality of which said cover and padding layers are additionally compacted, and said layers being bonded together along the bottoms of said despressed areas and indentations.

2. A flexible panel structure comprising an outer cover layer of thermoplastic resin, a pliable foundation and an intermediate padding layer, said cover and padding layers being compacted against the foundation at selected regions to provide depressed areas in which the cover layer along the bottoms of said areas is disposed below the cover layer in the regions adjoining said areas, the bottoms of said areas being additionally formed with a series of relatively narrow spaced substantially parallel grooves at the locality of which said cover and padding layers are additionally compacted, said layers being bonded together along the bottoms of said areas and grooves.

3. A flexible laminated panel structure comprising an outer cover layer, a pliable foundation including a bottom fabric layer and a layer of thermoplastic resin superimposed thereon, and an intermediate padding layer, said cover and padding layers being depressed at selected regions to provide grooves in which the cover layer along the bottoms of the grooves is disposed below the cover layer in the regions immediately adjacent to said grooves, the bottoms of said grooves being pressed to provide additionally a series of closely spaced indentations in the cover layer and said layers being bonded together at the locality of said grooves and indentations.

4. A flexible panel structure comprising an outer cover layer of thermoplastic resin, a pliable foundation and an intermediate padding layer, said cover and padding layers being depressed at selected regions to provide grooves in which the cover layer along the bottoms of the grooves is disposed below the cover layer in the regions immediately adjacent to said grooves, the bottoms of said grooves being additionally knurled to provide a series of closely spaced parallel grooves extending transversely of said first named grooves, and said layers being bonded together at the locality of said first and second named grooves.

5. A flexible laminated panel structure comprising an outer cover layer, a pliable foundation including a flexible layer of thermoplastic resin having a reinforcing fabric layer engaging a face thereof, and an intermediate padding layer, said cover and padding layers being compacted against the foundation at selected regions to provide depressed areas in which the cover layer along the bottoms of said areas is disposed below the cover layer in the regions adjoining said areas, the bottoms of said areas being additionally formed with a series of relatively narrow spaced substantially parallel grooves at the locality of which said cover and padding layers are additionally compacted, said layers being bonded together along the bottoms of said areas and grooves.

6. A flexible laminated panel structure comprising an outer cover layer of thermoplastic resin, a pliable foundation including a flexible layer of thermoplastic resin having a reinforcing fabric layer engaging the bottom face thereof, and an intermediate padding layer, said cover and padding layers being depressed at selected regions to provide grooves in which the cover layer along the bottoms of the grooves is disposed below the cover layer in the regions immediately adjacent to said grooves, the bottoms of said grooves being pressed to provide additionally a series of closely spaced indentations in the cover layer and said layers being bonded together at the locality of said grooves and indentations.

FRED LYIJYNEN.

REFERENCES CITED

The following references are of record in the file of this patent:

UNITED STATES PATENTS

| Number | Name | Date |
| --- | --- | --- |
| 2,113,128 | Cunnington | Apr. 5, 1938 |
| 2,226,181 | Ridderstrom | Dec. 24, 1940 |
| 2,227,212 | Beck | Dec. 31, 1940 |
| 2,287,159 | Zinser | June 23, 1942 |
| 2,322,226 | Cunnington | June 22, 1943 |